D. S. STEWART.
FOUR-WHEEL DRIVE TRUCK.
APPLICATION FILED JAN. 19, 1914.

1,105,218.

Patented July 28, 1914.
3 SHEETS—SHEET 1.

D. S. STEWART.
FOUR-WHEEL DRIVE TRUCK.
APPLICATION FILED JAN. 19, 1914.

1,105,218.

Patented July 28, 1914.
3 SHEETS—SHEET 2.

D. S. STEWART.
FOUR-WHEEL DRIVE TRUCK.
APPLICATION FILED JAN. 19, 1914.

1,105,218.

Patented July 28, 1914.

UNITED STATES PATENT OFFICE.

DAVID S. STEWART, OF ANTIGO, WISCONSIN, ASSIGNOR OF ONE-THIRD TO FRANK A. HECKER, OF ANTIGO, WISCONSIN, AND ONE-THIRD TO NORMAN C. WOODIN, OF SUPERIOR, WISCONSIN.

FOUR-WHEEL-DRIVE TRUCK.

1,105,218.  Specification of Letters Patent.  Patented July 28, 1914.

Application filed January 19, 1914. Serial No. 813,101.

*To all whom it may concern:*

Be it known that I, DAVID S. STEWART, a citizen of the United States, and resident of Antigo, in the county of Langlade and State of Wisconsin, have invented certain new and useful Improvements in Four-Wheel-Drive Trucks; and I do hereby declare that the following is a full, clear, and exact description thereof.

My invention refers to heavy duty motor-driven trucks, its object being to provide a simple, durable and economical truck of the above character wherein the four wheels are positively driven through the medium of simple gear connections from the source of power.

Specific objects of my invention are to provide a counter-shaft carried by each axle in gear connection with the truck wheels and a centrally disposed power-shaft; to provide each axle with a pivot mechanism to permit free swing of the same whereby steering is effected; to provide coupling connections in connection with the power-shaft, the couplings being alined with the axle pivots, whereby freedom of motion is permitted with respect to said axle; to provide means for trunnioning the front axle whereby the same is capable of vertical oscillation as well as horizontal swing; to provide a skeleton main frame having rigidly secured thereto an underslung saddle for the support of steering mechanism, the said saddle being provided with forwardly and rearwardly extended arms constituting a lower support for the axle pivot-pins, the upper pivot-pin support for the same being formed in a bolster that is carried by the skeleton frame; to provide hollow axles for the truck-wheels into which are nested the universal coupling members of the power-shaft; to provide means for rigidly suspending the main section of the power-shaft from the main frame, and to provide a simple, economical and effective flexible steering gear mechanism, whereby the front and rear axles are simultaneously swung upon their pivots to effect a steering movement, thus permitting the truck to turn within a small circumferential space.

With the above and other minor objects in view the invention consists in certain peculiarities of construction and combination of parts as hereinafter set forth with reference to the accompanying drawings and subsequently claimed.

Figure 1:
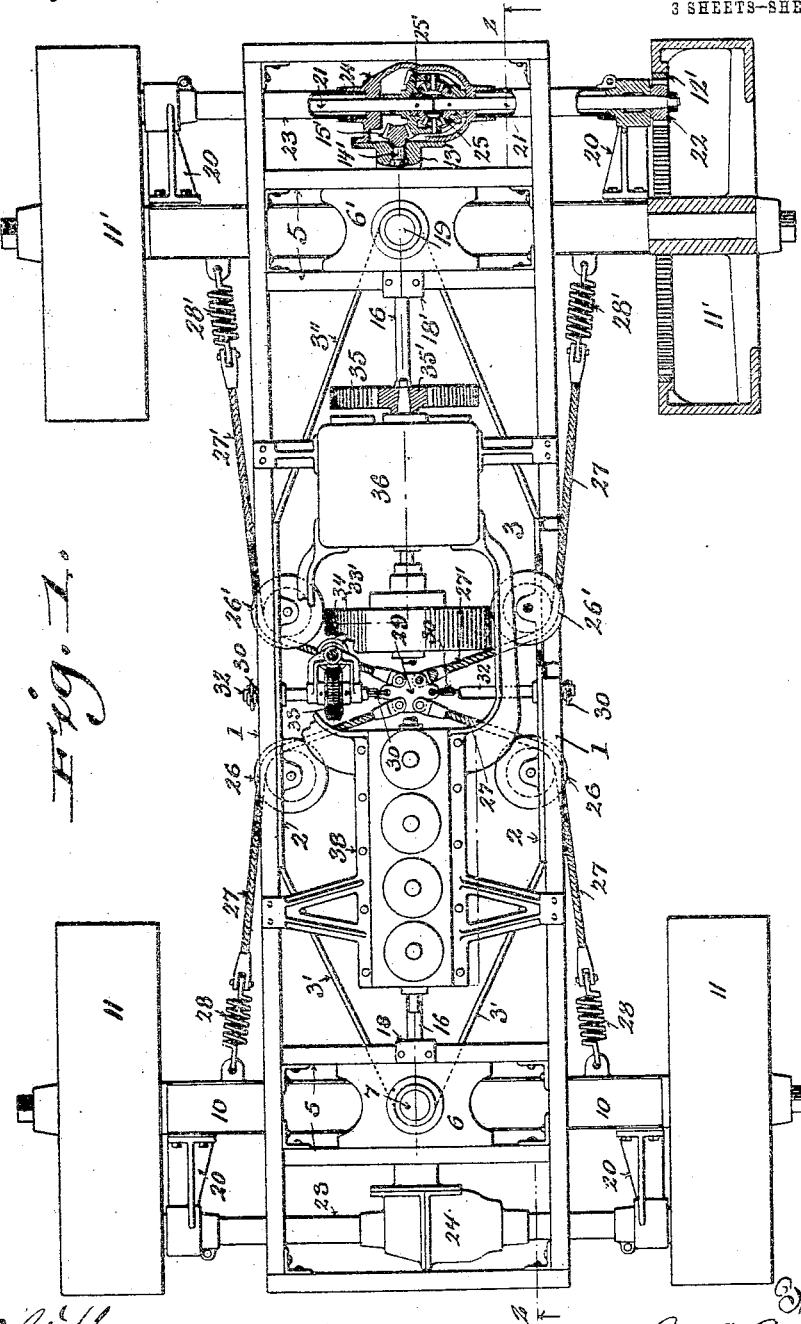
Figure 2:
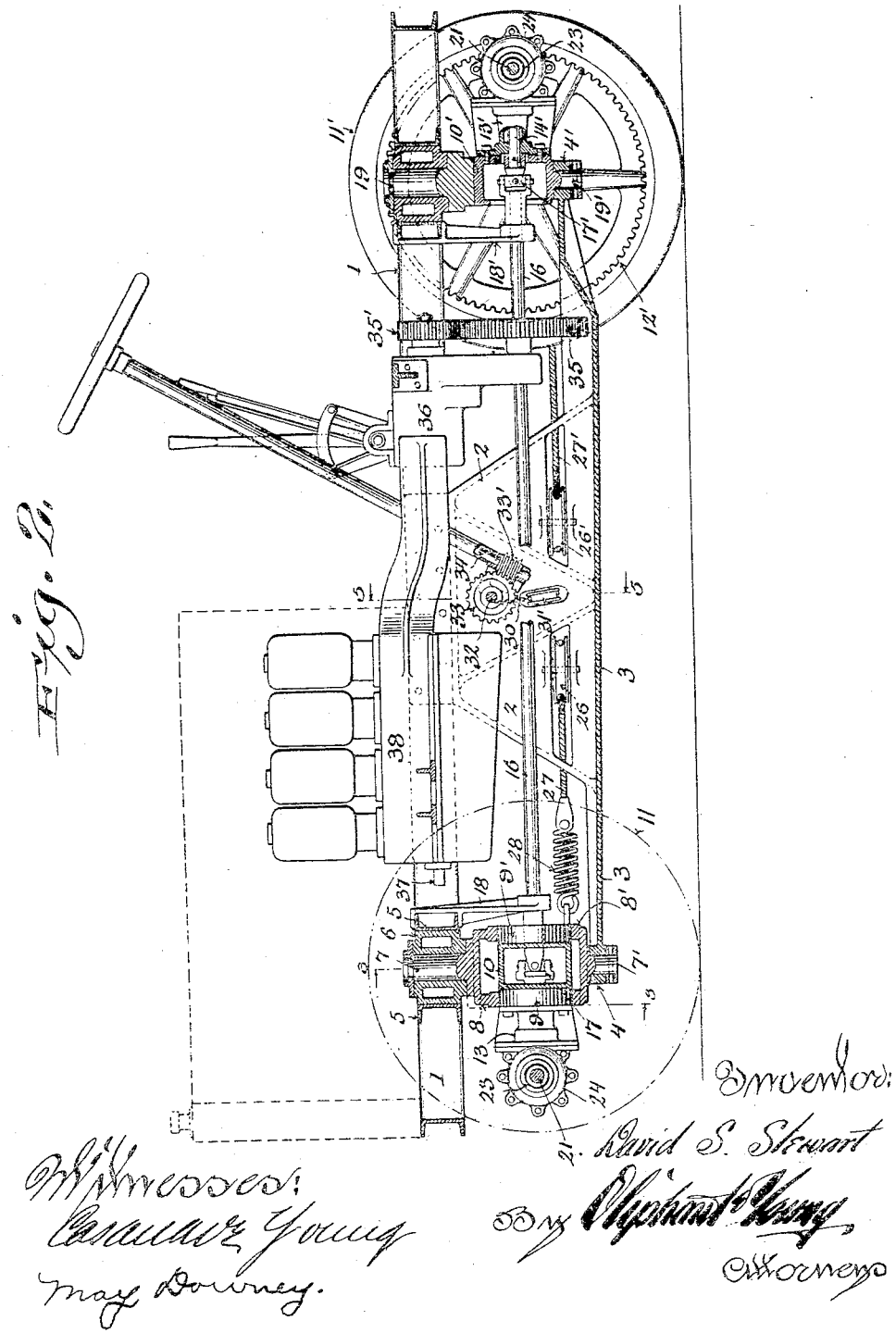
Figure 3:
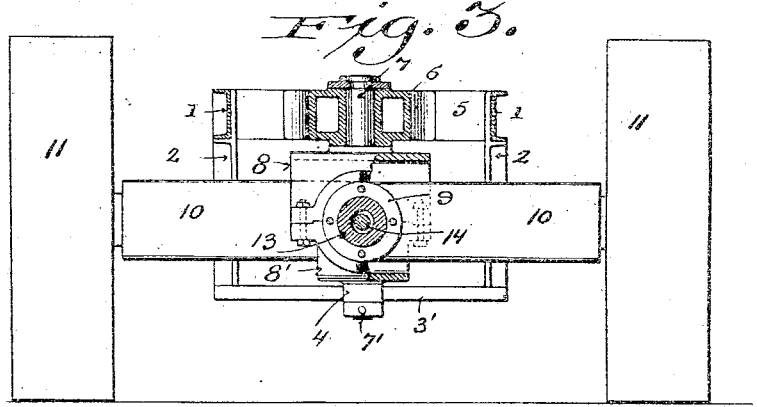
Figure 4:
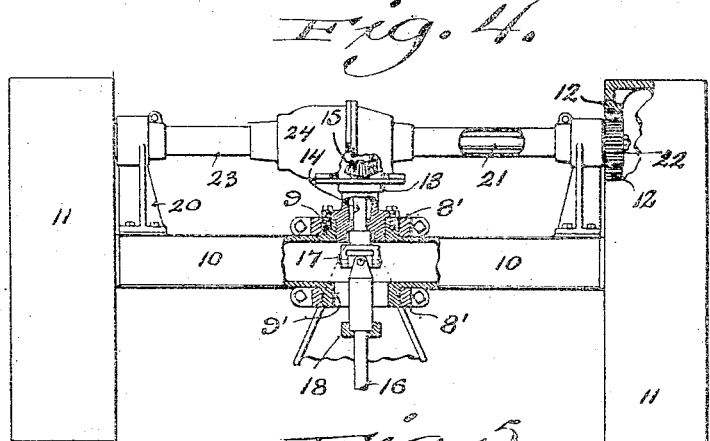
Figure 5:
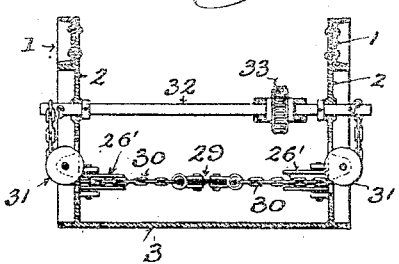

In the drawings Figure 1 represents a plan view of a truck embodying the features of my invention with parts broken away and in section to more clearly illustrate structural features; Fig. 2, a longitudinal central section of the same; Fig. 3, a detailed sectional front elevation of the truck-frame and its axle connection, the section being indicated by line 3—3 of Fig. 2; Fig. 4, a detailed sectional plan view of the front axle showing its trunnion connection with a pivoted or swiveled head, and Fig. 5, a detailed cross-section through the truck-frame illustrating the steering mechanism, the section being indicated by line 5—5 of Fig. 2.

Referring by characters to the drawings, 1, 1, represent the side sills of a rectangular main frame, to the central portion of which side sills are bolted the upwardly extended side walls 2 of a saddle 3, the same being undershung with respect to the main frame. The saddle is also provided with forwardly and rearwardly extended arms 3', 3'', respectively, which arms terminate with apertured boxes 4, 4', as best shown in Fig. 2. The main frame side sills have secured thereto transversely disposed pairs of angle-iron struts 5, 5, adjacent to the ends of said frame. Each pair of these struts have fitted therebetween a centrally apertured block 6, 6', which blocks, together with the struts constitute bolsters. The front bolster block 6 is adapted to receive the upper pivot pin 7 of a hollow head 8, the said head being also provided with a lower pivot-pin 7' that is swiveled within the saddle arm box 4. Thus said head is capable of horizontal swing within certain limits between the bolster and saddle arm. The front and rear walls of the hollow head 8 are provided with circular apertures for the reception of circular hollow trunnions 9, 9', which trunnions extend from the side walls of a hollow axle 10, the said axle being interposed between the side walls of the head and to permit assemblage of the axle the head 8 is formed with a lower detachable cap portion 8' which is bolted or otherwise secured to the upper portion of the head, as best shown in Fig. 3. The hollow axle 10 terminates with standard spindle sections, upon which are loosely mounted traction wheels 11, the same carrying internal gear-wheels 12. By this trunnion connection between the swivel head 8 and the axle 10, it is apparent that said axle is capable of both vertical and horizontal swing relative to its supporting frame, whereby the said axle may be swung for steering and is also capable of vertical oscillation to accommodate uneven road conditions.

The forward hollow trunnion 9 of the front axle has secured thereto a housing 13, which housing in effect constitutes a part of the axle and has journaled therein a spindle 14, one end of said spindle extending into the axle, while its opposite end has secured thereto a beveled pinion 15. The inner end of the spindle is coupled to the inner end of a power-shaft 16 by means of a universal coupling cross 17, the said inner end of the power-shaft being extended through the rear hollow trunnion 9' and is journaled in a hanger 18, which hanger depends from one of the sills of the front bolster. The rear end of the power-shaft is similarly journaled in a hanger 18' that depends from the corresponding strut 5 of the rear bolster mechanism. The rear hollow axle 10' carries an upper pivot-pin 19, and a lower pivot-pin 19', which pivot-pins are respectively mounted in the apertures of the rear bolster and the box 4' of the saddle-arm. This axle in other respects is similar to the forward axle, being centrally apertured for the reception of the rear end of the power-shaft 16, which rear end is connected to a second spindle 14' by a coupling cross 17', it being understood that the coupling connections between both spindle sections of the power-shaft are in axial alinement with the pivot-pins of their respective lines. The rear spindle section 14' is likewise journaled in a housing 13', which housing extends from the hollow axle. The said hollow axle also carries rear traction wheels 11' loosely mounted thereon, which traction wheels have secured thereto internal gear wheels 12', the said rear wheels being similar in every respect to the forward drive wheels. From the foregoing description with reference to the rear axle it is apparent that the same is only capable of horizontal swing for effecting a steering operation.

A pair of brackets 20, 20, extend from each axle having boxes at their ends for the reception of a counter-shaft 21, each of which counter-shafts carry pinions 22 at their ends that mesh with the gear-wheels of the respective pairs of traction wheels. Each counter-shaft 21 is provided with a housing 23, which housing is interrupted by a centrally disposed gear casing 24 for the reception of a compensating gear mechanism 25 of the ordinary type, said compensating gear being fixed to the interrupted sections of the counter-shaft. The compensating gear in each instance is provided with the usual beveled gear-wheel 25' one of which meshes with the beveled pinion 15 of the front power-shaft spindle section, while the rear beveled wheel 25' of the corresponding counter-shaft mechanism meshes with a beveled pinion 15' that is secured to the outer end of the rear spindle 14' and, in order to add to the rigidity of the counter-shaft drive mechanism, the gear casings 24, in connection with the front and rear axle mechanisms, are each secured to their respective housings 13, 13'.

Each side wall 2 of the saddle 3 carries a pair of guide-sheaves 26, 26', the front set of guide sheaves 26 being adapted to engage a pair of forwardly extended steering cables 27, which cables are connected to the ends of the front axle through the medium of coiled spring sections 28. The rear pair of guide sheaves form guides for similar cables 27' which are connected to the rear axle by coiled springs 28'. The ends of these four cables are connected to a spider 29, which is centrally disposed with relation to the saddle, the said spider being carried by chain sections 30, which chain sections extend in opposite directions and pass over guide-sheaves 31' that are mounted in the side walls of the saddle. The chain sections thereafter extend upwardly and are coiled about and secured to a winch-shaft 32, which winch-shaft is journaled in the side-wall of said saddle and carries a worm-wheel 33 that is adapted to engage a worm 33', the same being mounted upon a steering rod 34, whereby the steering mechanism just described is manipulated. By this arrangement it is apparent that when the steering rod is rotated in either direction that it will cause the winch-shaft to wind up one of the chain sections 30 and unwind the opposite chain section to thus shift the position of the spider 29 transversely, whereby one of the forward steering cables and one of the rearward steering cables will be drawn inwardly to thus swing the traction wheels to which they are indirectly connected in a corresponding position, whereby the truck is turned, it being understood that a reverse movement of the steering rod will cause a corresponding reverse movement of the traction wheels, whereby the vehicle is turned in the opposite direction. It is also apparent that, owing to the coiled springs, a yieldable connection is effected between the cables and their respective axles, whereby shock is absorbed and the steering apparatus is rendered more sensitive.

The main section of the power-shaft 16 carries a gear-wheel 35, which gear-wheel meshes with a pinion 35' that constitutes one member of a gear train, not shown, the same being mounted in a box 36 that is secured to the side sills 1, 1, of the main frame. This mechanism forms no part of my invention and is manipulated by the usual shift mechanisms, not shown, whereby the truck is driven at different speeds and reversed.

Power is imparted to the gear train carried in the transmission box 36 from the crank-shaft 37 of an engine 38, the casing of which engine is connected in a suitable manner to the side sills of the main frame, and also to the transmission gear-box, as best shown in Fig. 1 of the drawings.

From the foregoing description it is apparent that when power is applied to the power-shaft from the motor that said power is transmitted to the front and rear counter-shafts, whereby the four traction-wheels are positively driven, while at the same time both the front and rear axles may be turned in either direction for guiding the truck without imparting any undue strain upon the driving gear owing to the fact that the power-shaft is provided with front and rear couplings in alinement with the pivot points upon which the axles swing.

It will be further observed that, owing to the trunnion connection of the front axle and swiveled head 8, said front axle is capable of vertical oscillation about the power-shaft to permit compensation under uneven road conditions, this elasticity being provided for the purpose of eliminating undue strain upon the truck mechanism, whereby said truck will utilize its power economically and the life of the same will be materially lengthened.

I claim:

1. A truck comprising a main frame having front and rear apertured bolsters, a saddle rigidly suspended from the central portion of the frame having forwardly and rearwardly extended arms provided with apertured hubs in alinement with the bolster apertures, hollow axles carrying upper and lower pivot-pins engageable with the bolster and arm box apertures, front and rear hangers depending from the bolsters, a power-shaft mounted in said hangers having its opposite ends extended into the hollow axles, a spindle journaled in each hollow axle, and a coupling connection between each spindle and juxtaposed drive-shaft end, the coupling connections being alined with the axle pivot-pins, wheels loosely mounted upon the axles, and a counter-shaft carried by each axle in gear connection with its wheels and the related power-shaft spindle.

2. A truck comprising a main frame having front and rear apertured bolsters, a saddle rigidly suspended from the central portion of the frame having forwardly and rearwardly extended arms provided with apertured boxes in alinement with the bolster apertures, a horizontally apertured hollow head having upper and lower vertically disposed pivot-pins extending therefrom engageable with the front bolster and juxtaposed aperture of the saddle arm box, a hollow front axle having trunnions engageable with the horizontally disposed head apertures, a rear axle provided with upper and lower pivot-pins extending therefrom engageable with the rear bolster and arm box apertures, front and rear hangers depending from the bolsters, a power-shaft mounted in said hangers having its opposite ends extended into the hollow axles, a spindle journaled in each hollow axle, and a coupling connection between each spindle and juxtaposed drive-shaft end, the coupling connections being alined with the axle pivot-pins, wheels loosely mounted upon the axles, and a counter-shaft carried by each axle in gear connection with its wheels and the related power-shaft spindle.

3. A truck comprising a main frame having front and rear apertured bolsters, a saddle rigidly suspended from the central portion of the frame having forwardly and rearwardly extended arms provided with apertured hubs in alinement with the bolster apertures, hollow axles carrying upper and lower pivot-pins engageable with the bolster and arm box apertures, front and rear hangers depending from the bolsters, a power-shaft mounted in said hangers having its opposite ends extended into the hollow axles, a spindle journaled in each hollow axle, and a coupling connection between each spindle and juxtaposed drive-shaft end, the coupling connections being alined with the axle pivot-pins, wheels loosely mounted upon the axles, a counter-shaft carried by each axle in gear connection with its wheels and the related power-shaft spindle, and steering mechanism mounted in the saddle having flexible connections to the ends of each axle.

4. A truck comprising a frame having front and rear apertured bolsters, a saddle rigidly secured to the central portion of the frame having forwardly and rearwardly extended arms provided with apertured hubs in alinement with the bolster apertures, a horizontally apertured hollow head provided with upper and lower pivot-pins engageable with the front bolster and aperture of the saddle arm box, a hollow axle provided with horizontally disposed trunnions engageable with the horizontally disposed apertures of the hollow head, a hollow rear axle having upper and lower pivot-pins extending therefrom engageable with the rear bolster aperture and box aperture of the saddle arm, front and rear hangers depending from the bolsters, a power-shaft mounted in the hangers having its ends extending into the hollow axles, a spindle journaled in each hollow axle, couplings connecting each spindle and juxtaposed power-shaft end, the couplings being alined with the axle trunnions, brackets extending from the front and rear axles, a counter-shaft carried by each set of brackets, a gear connection between each counter-shaft and the juxtaposed spindle, traction wheels loosely mounted upon each axle, toothed gear-wheels carried by the traction wheels, pinions carried by the pair of counter-shafts engageable with the toothed gear-wheels, and a steering mechanism carried by the frame for simultaneously swinging the aforesaid front and rear axles.

In testimony that I claim the foregoing I have hereunto set my hand at Antigo in the county of Langlade and State of Wisconsin in the presence of two witnesses.

DAVID S. STEWART.

Witnesses:
WALTER S. ROWLINSON,
JOHN W. BROWN.